Sept. 13, 1960　　　　　　　R. GOUIRAND　　　　　　　2,952,474
PNEUMATIC SUSPENSION FOR VEHICLES
Filed Feb. 23, 1956　　　　　　　　　　　　　　　　4 Sheets-Sheet 3
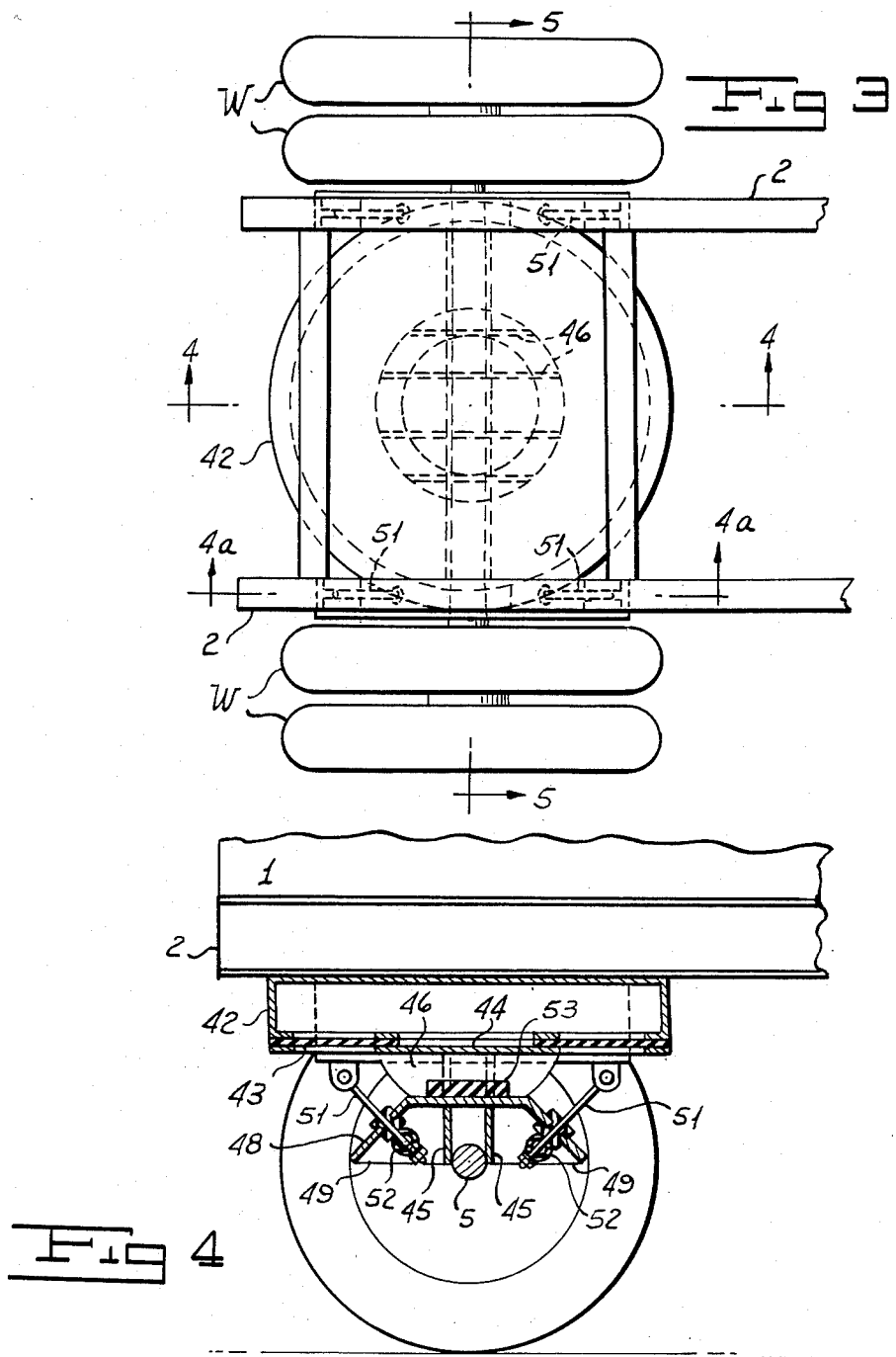
INVENTOR
RENE GOUIRAND
BY
ATTORNEY Sept. 13, 1960  R. GOUIRAND  2,952,474
PNEUMATIC SUSPENSION FOR VEHICLES
Filed Feb. 23, 1956  4 Sheets-Sheet 4
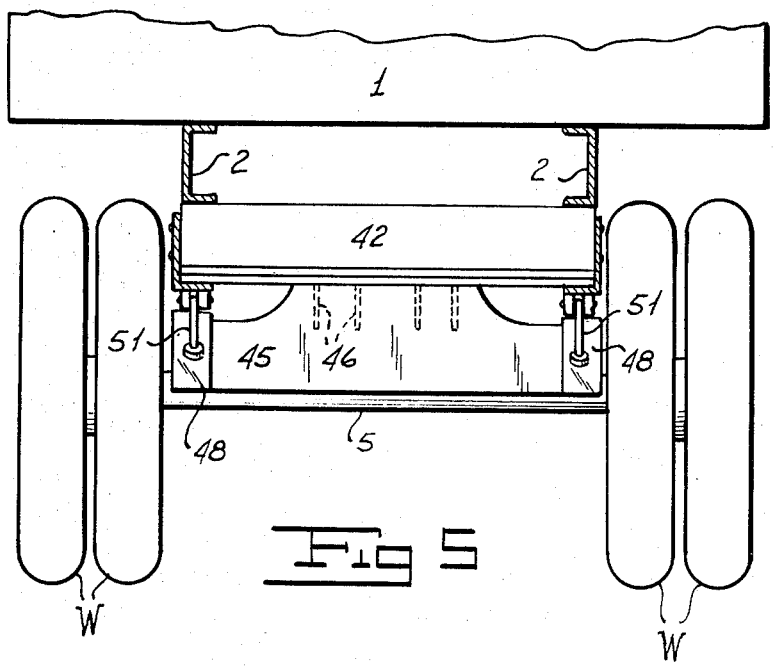
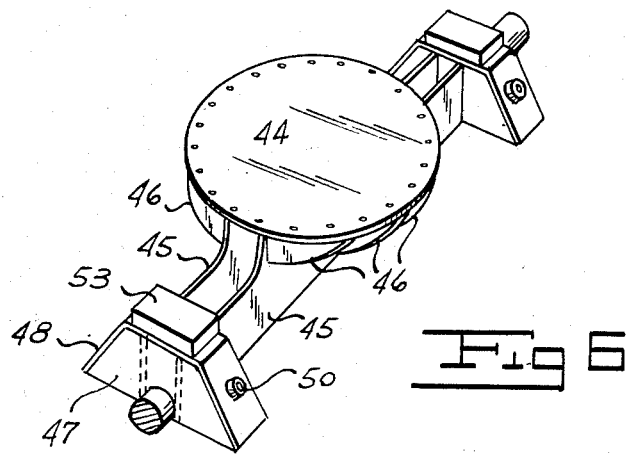
INVENTOR
RENE GOUIRAND
ATTORNEY

United States Patent Office 2,952,474
Patented Sept. 13, 1960

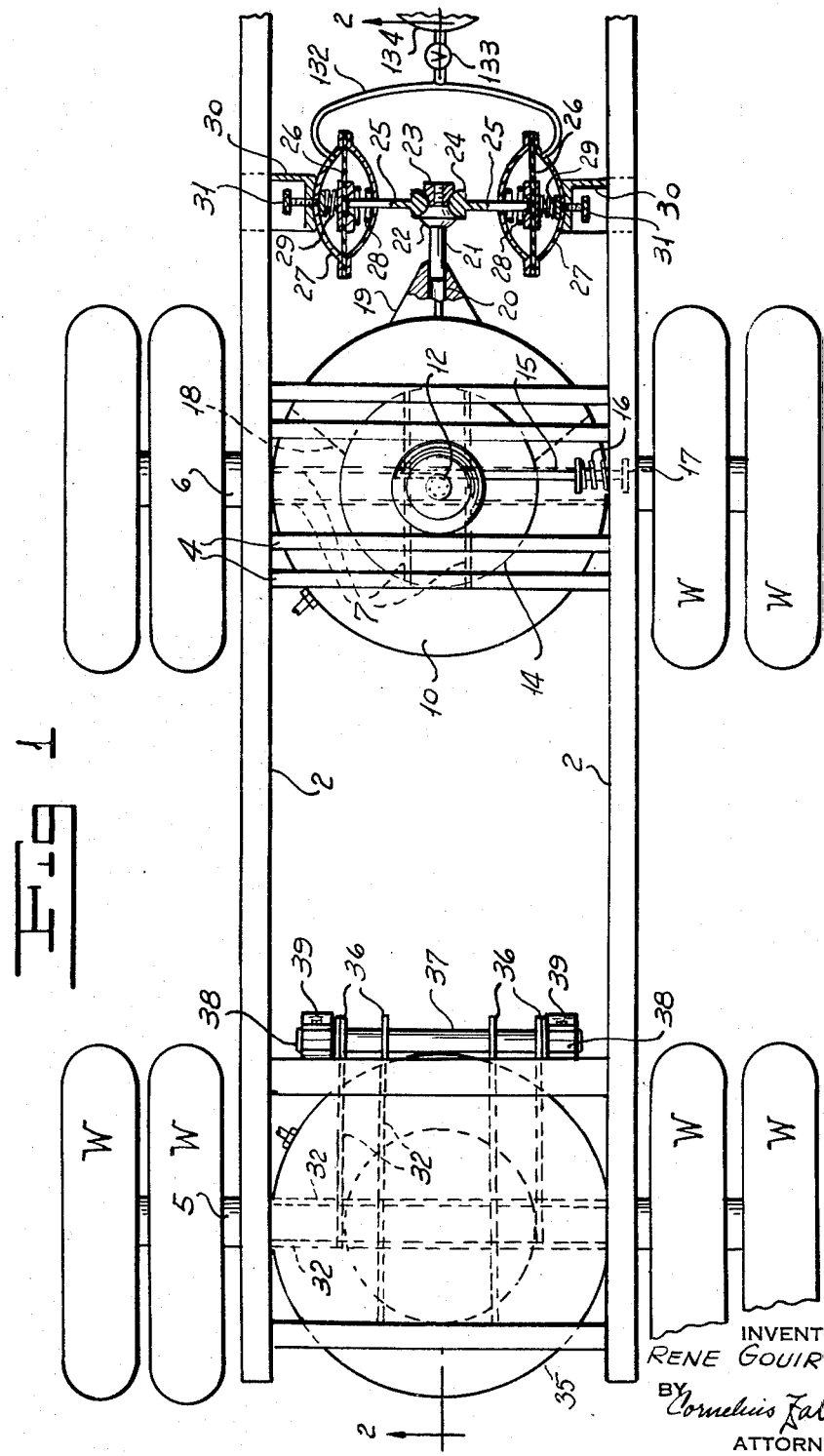

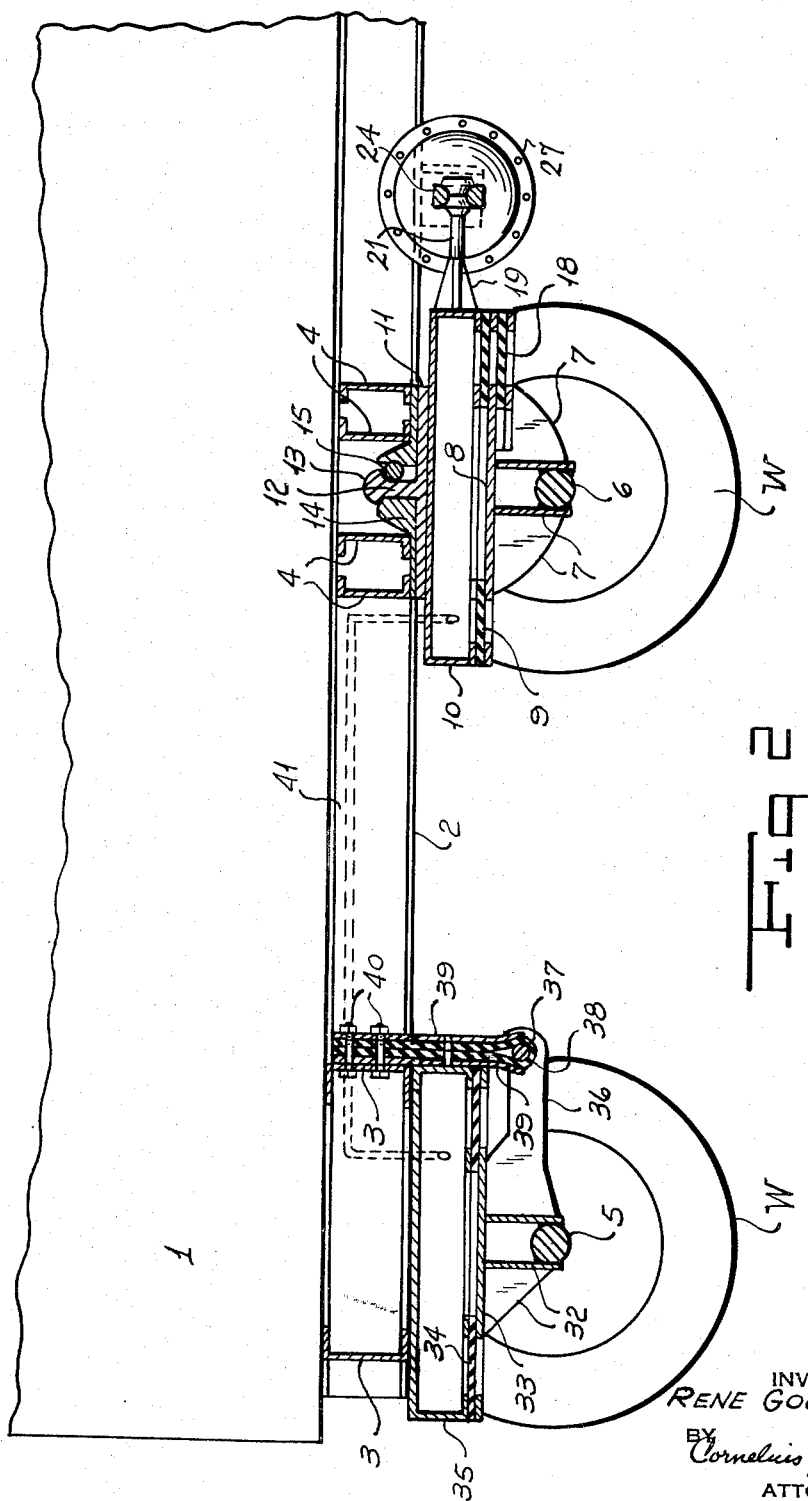

2,952,474

PNEUMATIC SUSPENSION FOR VEHICLES

Rene Gouirand, 210 W. 88th St., New York, N.Y.

Filed Feb. 23, 1956, Ser. No. 567,286

6 Claims. (Cl. 280—113)

This invention relates to pneumatic suspensions for vehicles and is directed more particularly to suspensions useful in trucks and trailers embodying tandem wheel construction, i.e., arrangements wherein the rear portion of the truck or trailer is supported on axles spaced apart longitudinally of the vehicle, so as to provide for the support of heavy loads.

Various tandem wheel and axle constructions have heretofore been suggested. The most common and well known, which has given the best results prior to this invention, has been that wherein two separate and independent wheeled axles are spaced longitudinally of the trailer body in the neighborhood of 50" apart, although in some cases they may be as much as 9 ft. apart, the spacing being provided to stabilize weight and permit of the carrying of heavier loads. In this prior construction, the forward of these axles has a spring suspension with the body to maintain that axle at all times normal to the longitudinal center line of the body, while the rear axle is connected with the spring suspension of the forward axle and serves to assist in carrying the weight on such suspension while permitting the latter axle to change its angular relation to the center line of the body in order to effect automatic steering which results in better tracking.

With said prior construction, the forward spring suspension is required to carry the weight imposed upon both axles which requires connecting parts to be relatively heavy and the suspension to be very strong. The present invention, in contradistinction, provides for the use of a tandem axle construction wherein each axle has its own individual suspension through which the load on the vehicle is directly transmitted to the corresponding axle, rather than through a suspension common to both axles.

In practice either of these dual suspensions may be used in conjunction with a single axle but they are preferably used in tandem arrangement. In fact, any appropriate number of such suspensions may be employed in tandem. This is made possible by so constituting one of the suspensions that the axle thereof will automatically change direction with a change of direction of the vehicle to effect automatic steering. This is true either when a single axle is used or with axles in tandem.

The suspensions employed may be the same for each axle of the tandem construction or they may be different, but where tandem constructions are employed, one of such axles may be of the non-steering type, but in such cases the other axle or axles should be of the steering variety hereinafter described.

The invention embodies numerous novel features. One of these features, other than those to which I have already referred, is the provision of a pneumatic suspension for an associated axle which has pivotal connection with the body of the vehicle, in combination with a steering device which functions automatically to pivot upon changing the direction of the vehicle. This steering device may be spring or pneumatically controlled or both, the pneumatic control being accomplished by automatically operable differential pressures.

In the preferred form of the invention, the pivotal suspension is pneumatic, with pivot connection between the pneumatic parts and the vehicle body, although, in practice, certain features of this invention may be availed of through the use of leaf springs in lieu of a pneumatic construction, with pivotal connection between the springs and the body.

Another feature of the invention consists in a novel pneumatic suspension interposed between a non-pivotal axle and a vehicle body to maintain the axle at all times normal to the longitudinal medial line of the body and embodying a self alining construction to insure this condition at all times.

Another feature of the invention comprises a novel pneumatic suspension embodying an arrangement adapted to act as a snubber, also to take up the strains of draft and braking and also operable as a stabilizer to minimize sidesway.

Another feature of the invention consists in connecting the several pneumatic suspensions to properly share at all times in the carrying of the load imposed thereon.

Features of the invention, other than those adverted to, will be apparent from the hereinafter detailed description and appended claims, when read in conjunction with the accompanying drawings.

The accompanying drawings illustrate different practical embodiments of the invention, but the constructions therein shown are to be understood as illustrative, only, and not as defining the limits of the invention.

Fig. 1 is a plan view of the chassis of a tandem axle suspension with the body removed and parts in central section.

Fig. 2 is a section on the line 2—2 of Fig. 1.

Fig. 3 is a plan view of a modified form of suspension for supporting the rear axle.

Fig. 4 is a longitudinal section of the structure shown in Fig. 3 with the pneumatic chamber of the suspension in central section on the line 4—4 of Fig. 3 and one of the stabilizers and snubbers in section in the plane of the line 4a—4a of Fig. 3.

Fig. 5 is a transverse section on the line 5—5 of Fig. 3.

Fig. 6 is a perspective view of a portion of the assembly shown in Figs. 3–5 removed from the diaphragm which forms part of the pneumatic suspension and with the wheels omitted.

Referring first to Figs. 1 and 2 of the drawings, 1 designates a body of the vehicle which is supported on any appropriate chassis frame comprising side bars 2 and cross bars 3 and 4. Figs. 1 and 2 show the rear end portion of, for example, a trailer and in the construction which I have chosen for illustration, this part of the trailer is supported on axles 5 and 6 which are normally parallel to one another and are spaced apart in a direction longitudinally of the chassis. The axle 5, which will be referred to as a rear axle of the tandem, is so mounted with respect to the chassis frame that it is at all times maintained in a direction normal to the axis of the vehicle so that this axle is a non-pivoted axle. The axle 6, which will be referred to as the forward axle, is mounted for pivotal movement on a vertical axis which passes through the medial plane of the chassis frame. Both axles are of course provided with appropriate wheels W which may be either single or dual as desired.

To the front axle 6 are welded or otherwise rigidly secured a plurality of upstanding webs 7 which abut the under side and are welded to a plate 8. The periphery of this plate overlaps the inner margin of an annular diaphragm 9. This diaphragm is preferably formed by laminating the requisite number of fabric plies, such as nylon plies, with rubber between and covering them, so as to give a fairly elastic but very strong and sufficiently flexible diaphragm to permit it to be readily flexed without damage due to fatigue. Its inner margin may be secured to the plate 8 by bolts, rivets or in any other appropriate manner provided, however, that the joint between these parts is such as to be pneumatically leakproof. In fact the diaphragm may extend entirely across the upper surface of the plate 8, although this is not necessary.

The outer margin of the diaphragm 9 overlaps and is secured with a hermetic seal to the wall of a pneumatic chamber 10. This chamber is in turn secured to a disk 11 provided with a central king pin 12 which has an enlarged head 13. The king pin extends through an opening in a bearing plate 14 and is normally locked against disengagement therefrom by a locking rod 15 which extends through the side of the chassis frame and is normally held in engagement with the rod by a spring 16. The locking rod 15 is provided at its outer end with a suitable handle 17 whereby it may be withdrawn against the tension of the spring to release the king pin 12 when it is desired to remove the pneumatic suspension from the chassis frame. The bearing plate 14 is welded or otherwise permanently secured to the cross bars 4 of the chassis frame and constitutes a permanent part of the chassis frame.

The diaphragm may be reinforced against damage by braking and draft strains by adding an additional diaphragm section 18 of arcuate form, as shown in Figs. 1 and 2. This diaphragm section preferably extends about one-third or one-half way round the plate 8, although it may be of lesser or greater extent without departing from this invention.

With the construction described, it will be apparent that the front axle 6, together with the entire superimposed pneumatic suspension, is mounted for pivotal movement on the vertical axis of the king pin 12. The pivotal movement of these parts is controlled by the following mechanism:

Extending forwardly from the front side of the pneumatic chamber 10 is a boss 19 provided therein with a socket 20. Extending into this socket for sliding movement therein is a steering reach 21 having a bearing head 22. The outer end of the reach is threaded to receive a nut 23 which serves to confine a ring 24 between the nut and the head. The inner periphery of the ring is of semi-circular cross section, so that it may readily oscillate between the head and the nut.

Extending from diametrically opposite sides of the ring 24 are a pair of rods 25, the outer ends of which bear against diaphragms 26. These diaphragms are enclosed within casings 27 with springs 28 bearing against the adjacent faces of the diaphragms and springs 29 bearing against the distant faces. The casings 27 of the diaphragms are rigidly supported on the frame by means of brackets 30 or in any other suitable manner and adjustment screws 31 are threaded through these brackets and may be manually manipulated to adjust the tension of the springs 29.

The springs 28 and 29 serve to normally centralize the ring 24 and maintain the reach bar parallel to the axis of the frame. This condition will prevail so long as the vehicle is traveling along a rectilinear path. However, if the vehicle changes direction, the torque set up by the forward wheels will act against the differential pressures of the springs to effect pivotal movement of the forward suspension and axle in a direction to effect satisfactory tracking of the several wheels of the vehicle. As soon as the vehicle reassumes a rectilinear path, the differential pressures of the springs will restore the axle and suspension to normal position wherein the axle will be normal to the longitudinal axis of the vehicle.

The springs to which I have referred may be utilized for this purpose without the employment of other means.

However, I prefer to connect the distant sides of the casings 27 by a tubular by-pass 132 and place said bypass in communication through a passage including a valve 133 with a source of compressed air 134. The amount of compressed air admitted into the casings at the remote sides of the two diaphragms may be controlled through manipulation of the valve 133 and after the desired pressures have been introduced, the valve is closed. In practice, the compressed air control may be used without necessarily employing the springs to which I have referred, although I preferably employ both.

The operations described permit the automatic steering of the front axle as may be necessary to the proper tracking of the wheels notwithstanding the relatively fixed position of the rear axle.

This rear axle may be supported against pivotal movement in any appropriate way. One mechanism for accomplishing this result pneumatically is shown in Figs. 1 and 2, while a second form of the invention is shown in Figs. 3–6.

Referring first to Figs. 1 and 2, it will be noted that the rear axle 5 is welded to a series of fins 32 which abut and are welded to the under side of a plate 33 which, like the plate 8, is secured to the inner margin of a diaphragm 34, the outer margin of which is secured to a peripheral wall of a pneumatic chamber 35. This chamber is fixedly secured to the under side of the chassis frame by bolts, welding or otherwise. Certain of the fins 32 are provided with forwardly extending arms 36. These arms are perforated near the outer ends and a rod 37 is passed through the perforations.

Directly above the end portions of the rod 37, there is attached to one of the cross bars 3 of the frame, the upper ends of two slings 38 which may be of rubber fabric or a laminated combination of both. These slings extend downwardly and loop around the rod 37, as shown best in Fig. 2. Leaf springs 39 engage with both the front and back faces of each of the slings and both the slings and leaf springs are secured to the cross bar 3 by means of bolts 40. The slings act as snubbers against movement of the axle in a downward direction, while the leaf springs, because of their inherent resiliency, act to permit lateral tilting of the axle.

In practice I preferably connect the interiors of the two pneumatic chambers 10 and 35 by any suitable conduit 41, so that the pressures in the two chambers thereof may be substantially equalized at all times. This is highly desirable for, in the absence of such an arrangement, one axle might be carrying all or most of the load, while the other axle is carrying none or less when the vehicle is passing over an undulating surface. In the connection described, the load will be equalized on both axles.

It will of course be understood that compressed air is fed into the compressed air chambers from any suitable source of compressed air on the vehicle and may be controlled in any desired way well known in the art to provide sufficient pressure in the chambers to support the load to be carried.

In the modified structure of Figs. 3–6, the pneumatic chamber 42 is mounted on the under side of the chassis frame, is secured to the outer margin of a diaphragm 43, while its inner margin is secured to a plate 44, as hereinbefore described. However, the attachment of this plate to the axle 5 is somewhat different than as hereinbefore stated. In contradistinction, to the under side of the plate are attached two transverse fins 45 which straddle the axle 5 and are welded thereto. Longitudinal fins 46 are welded to the under side of the plate 44 and abut abainst and are welded to the outer surfaces of the fins 45, as shown best in Fig. 6. The opposite ends of the transverse fins 45 abut and are welded to plates 47 which have substantially the shape of an isosceles trapezoid and over each of these plates and welded thereto is an apron 48 of similar shape. Gussets 49 are welded along the inner edges of said aprons. This arrangement produces an extremely rigid construction, whereby the plate 44 is supported on the axle 5.

The front and rear sloping surfaces of the aprons 48 are provided with openings 50 for snubber rods 51. The upper ends of these rods are secured to the walls of the pneumatic chamber fore and aft of the axle and they extend downwardly through bushings in the openings 50 of the apron and through hollow rubber cushions 52 and receive nuts at their lower ends. These cushions 52 are of hollow spherical form and thus provide a marked cushioning effect upon the arms 51 which act as snubbers and stabilizers and minimize side sway, while assisting in taking up draft and braking strains. This is particularly so because the plates 47 and the aprons 48 are rigid with the axle while the rods 51 bridge the diaphragm and are connected to the pneumatic chamber 42. These parts are thus well adapted to protect the diaphragm from damage due to the strains referred to.

As shown in Figs. 4 and 6, there is mounted on the top of each apron a resilient cushion 53 which, in the event of sudden impact, is adapted to engage with the under side of the pneumatic chamber and thus limit the downward movement of the chassis in such manner as to preclude rupture of the diaphragm due to such shocks.

In the structures which I have described, the suspensions of both the front and rear axles 6 and 5 are pneumatic in character. This is the preferred construction. I am aware, however, that certain advantages of this invention may be obtained by substituting steel springs for the pneumatic chambers and diaphragms which I have shown and described in the accompanying drawings.

The foregoing description and accompanying drawings show the invention in its preferred practical forms, but the invention is to be understood as fully commensurate with the appended claims.

Having thus fully described the invention, what I claim as new and desire to secure by Letters Patent is:

1. A vehicle having a chassis frame with a pneumatic chamber positioned beneath the same and having a flexible diaphragm at its bottom, an axle positioned beneath and secured to the diaphragm, and a second diaphragm section of arcuate form interposed between the axle and the peripheral wall of the pneumatic chamber to reinforce the first mentioned diaphragm against damage by draft and braking strains.

2. A vehicle comprising: a chassis frame, an axle beneath said frame, suspension means interposed between the frame and the axle for supporting the frame therefrom, said suspension means including a pivotal connection between the axle and the frame midway of the width of the latter to permit pivotal movement of the axle on a vertical axis midway of the width of the frame, and differential pressure mechanism connected to the suspension means of said axle to maintain the axle perpendicular to the direction of movement of the chassis frame when said frame is moving in a rectilinear direction, said differential pressure mechanism comprising a reach secured to the suspension means of the axle, diaphragms acting against the opposite sides of said reach, enclosures at the distant sides of said diaphragms, a by-pass connecting said enclosures, and means for admitting compressed air into said enclosures.

3. A vehicle according to claim 2, comprising springs acting against the opposite sides of each diaphragm, and means for adjusting the power of the springs on the enclosure sides of said diaphragms.

4. A vehicle according to claim 3, wherein all of said springs are housed within enclosures.

5. A vehicle comprising: a chassis frame, a rigid compressed air casing the bottom of which is provided with a flexible diaphragm, a wheeled axle beneath and secured to the diaphragm, a king pin centrally connecting the top wall of the casing to the chassis frame, a reach secured to the casing and projecting longitudinally of the vehicle, and pneumatically controlled diaphragms acting under differential pressures against the opposite sides of the reach to permit proper tracking of the vehicle.

6. A vehicle according to claim 5, wherein there is a pneumatic chamber back of each pneumatically controlled diaphragm and wherein said chambers are connected by a constricted compensating passage.

References Cited in the file of this patent

UNITED STATES PATENTS

| | | |
|---|---|---|
| 184,660 | Pine | Nov. 21, 1876 |
| 629,050 | Stuebner | July 18, 1899 |
| 770,847 | Downer | Sept. 27, 1904 |
| 1,414,623 | Church | May 2, 1922 |
| 1,871,735 | Prins | Aug. 16, 1932 |
| 2,250,134 | Pointer | July 22, 1941 |
| 2,433,268 | Fellabaum | Dec. 23, 1947 |
| 2,502,946 | Hart | Apr. 4, 1950 |
| 2,631,043 | Shaffer | Mar. 10, 1953 |
| 2,694,569 | Gouirand | Nov. 16, 1954 |
| 2,731,276 | Cross | Jan. 17, 1956 |
| 2,807,474 | Farris | Sept. 24, 1957 |